US010789446B2

(12) United States Patent
Tian et al.

(10) Patent No.: US 10,789,446 B2
(45) Date of Patent: Sep. 29, 2020

(54) DEVICE FOR FINGERPRINT RECOGNITION, MANUFACTURING METHOD THEREFOR, AND ELECTRONIC APPARATUS

(71) Applicants: Beijing BOE Optoelectronics Technology Co., Ltd., Beijing (CN); BOE Technology Group Co., Ltd., Beijing (CN)

(72) Inventors: Ting Tian, Beijing (CN); Ming Zhai, Beijing (CN); Shuqian Dou, Beijing (CN); Xiaoliang Fu, Beijing (CN); Dayong Zhou, Beijing (CN); Zhiqiang Fan, Beijing (CN); Liguang Deng, Beijing (CN); Youcai Yang, Beijing (CN); Zhongjun Wang, Beijing (CN); Dong Zhang, Beijing (CN); Yongjie Han, Beijing (CN); Jinge Zhao, Beijing (CN); Jia Meng, Beijing (CN); Yanjun Liu, Beijing (CN); Yu Liu, Beijing (CN)

(73) Assignees: BEIJING BOE TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/281,352

(22) Filed: Feb. 21, 2019

(65) Prior Publication Data

US 2019/0370520 A1 Dec. 5, 2019

(30) Foreign Application Priority Data

May 30, 2018 (CN) .......................... 2018 1 0540711

(51) Int. Cl.
*G06K 9/00* (2006.01)

(52) U.S. Cl.
CPC ....... *G06K 9/0002* (2013.01); *G06K 9/00067* (2013.01)

(58) Field of Classification Search
CPC .......... G06K 9/00006; G06K 9/00013; G06K 9/0004

See application file for complete search history.

(56) References Cited

U.S. PATENT DOCUMENTS

2007/0290613 A1  12/2007  Choi et al.
2011/0233603 A1   9/2011  Kim et al.
(Continued)

FOREIGN PATENT DOCUMENTS

CN   102239576 A   11/2011
CN   102692831 A    9/2012
(Continued)

OTHER PUBLICATIONS

Office Action, including Search Report, for Chinese Patent Application No. 201810540711.6, dated Apr. 8, 2020, 17 pages.

*Primary Examiner* — Koosha Sharifi-Tafreshi
(74) *Attorney, Agent, or Firm* — Westman, Champlin & Koehler, P.A.

(57) ABSTRACT

A device for fingerprint recognition, a manufacturing method therefor, and an electronic apparatus are provided. The method includes: forming fingerprint recognition units in multiple independent preset regions of a substrate, where the fingerprint recognition units each include a fingerprint recognition component and a light emitting component; partitioning the substrate along boundaries of the preset regions to separate the fingerprint recognition units from each other; and coupling the fingerprint recognition units after partition with corresponding control circuits, to make the fingerprint recognition component and the light emitting component of each fingerprint recognition unit be electrically connected to a corresponding control circuit coupled (Continued)

with the each fingerprint recognition unit. The fingerprint recognition unit and the control circuit coupled with each other serve together as the device for fingerprint recognition. The method is for manufacturing the device for fingerprint recognition.

12 Claims, 4 Drawing Sheets

(56) References Cited

U.S. PATENT DOCUMENTS

| | | | |
|---|---|---|---|
| 2015/0243571 A1* | 8/2015 | Tsai | ............... H01L 23/041 |
| | | | 257/680 |
| 2018/0269352 A1 | 9/2018 | Tian et al. | |
| 2019/0095673 A1* | 3/2019 | Ting | ............... G06K 9/22 |

FOREIGN PATENT DOCUMENTS

| | | | |
|---|---|---|---|
| CN | 104037294 A | 9/2014 |
| CN | 104156711 A | 11/2014 |
| CN | 104485405 A | 4/2015 |
| CN | 105742440 A | 7/2016 |
| CN | 106295606 A | 1/2017 |
| CN | 106778598 A | 5/2017 |
| CN | 206178862 U | 5/2017 |
| CN | 107068811 A | 8/2017 |

\* cited by examiner

DEVICE FOR FINGERPRINT RECOGNITION, MANUFACTURING METHOD THEREFOR, AND ELECTRONIC APPARATUS

CROSS-REFERENCE TO RELATED APPLICATION

This application claims a priority to Chinese Patent Application No. 201810540711.6 filed on May 30, 2018, the disclosure of which is incorporated in its entirety by reference herein.

TECHNICAL FIELD

The present disclosure relates to the field of fingerprint recognition technology, and in particular to a device for fingerprint recognition, a manufacturing method therefor, and an electronic apparatus.

BACKGROUND

With the rapid development of terminal technology, a technique of controlling a terminal apparatus through fingerprint recognition turns mature gradually. In related technologies, controlling a terminal apparatus through fingerprint recognition mainly includes: unlocking the terminal apparatus through fingerprint recognition, and controlling functional modules in the terminal apparatus to achieve corresponding functions through fingerprint recognition. In the related technologies, when controlling the terminal apparatus through fingerprint recognition, the terminal apparatus cannot directly reflect a result of the controlling through fingerprint recognition, resulting in a poor user experience.

SUMMARY

In an aspect, a method for manufacturing a device for fingerprint recognition is provided in the present disclosure. The method includes: forming fingerprint recognition units respectively in multiple independent preset regions of a substrate, where the fingerprint recognition units each include a fingerprint recognition component and at least one light emitting component; partitioning the substrate along respective boundaries of the preset regions to separate the fingerprint recognition units from each other; and coupling the fingerprint recognition units after partition respectively with corresponding control circuits, to make the fingerprint recognition component and the light emitting component of each fingerprint recognition unit be electrically connected to a corresponding control circuit that is coupled with the each fingerprint recognition unit, where the fingerprint recognition unit and the control circuit coupled with each other serve together as the device for fingerprint recognition.

In some embodiments of the present disclosure, forming the light emitting components in the multiple independent preset regions of the substrate includes: forming a first semiconductor layer, a light emitting layer and a second semiconductor layer successively in a first sub-region of each preset region of the multiple preset regions of the substrate; etching a part of the light emitting layer and a part of the second semiconductor layer in the first sub-region to expose a part of the first semiconductor layer; and forming a first electrode on the exposed first semiconductor layer in the first sub-region, and forming a second electrode on the second semiconductor layer remained after etching in the first sub-region.

In some embodiments of the present disclosure, the forming the light emitting components in the multiple independent preset regions of the substrate further includes: binding a lead substrate, having a first lead and a second lead, to the first sub-region. The first lead and the second lead of the lead substrate are respectively bonded to the first electrode and the second electrode of the first sub-region correspondingly coupled with the lead substrate, and the first lead and the second lead are arranged to be electrically connected to the control circuit.

In some embodiments of the present disclosure, binding the lead substrate, having the first lead and the second lead, to the first sub-region includes: arranging a first metallic ball and a second metallic ball on the first electrode and the second electrode of the first sub-region, where a distance of a top of the first metallic ball from a surface of the substrate is identical to or substantially identical to a distance of a top of the second metallic ball from the surface of the substrate; and providing the lead substrates in a one-to-one correspondence to the first sub-regions, and welding the first lead and the second lead of each lead substrate of the lead substrates onto the first metallic ball and the second metallic ball of the first sub-region corresponding to the each lead substrate.

In some embodiments of the present disclosure, forming the first semiconductor layer, the light emitting layer and the second semiconductor layer successively in the first sub-region of each preset region of the multiple preset regions of the substrate includes: forming a sacrificial pattern, which has an opening, in the first sub-region of the each preset region on the substrate; taking a portion of the substrate corresponding to the opening in the first sub-region as a growth base, and growing a buffer layer on the growth base in the first sub-region; forming the first semiconductor layer, the light emitting layer and the second semiconductor layer on the buffer layer of the first sub-region successively; and removing the sacrificial pattern from the first sub-region.

In some embodiments of the present disclosure, forming the fingerprint recognition components in the multiple independent preset regions of the substrate includes: forming an ink layer in a second sub-region of each preset region of the multiple preset regions of the substrate; and providing a fingerprint chip on the ink layer in the second sub-region, where the fingerprint chip is arranged to be electrically connected to the control circuit.

In some embodiments of the present disclosure, forming the first semiconductor layer, the light emitting layer and the second semiconductor layer successively in the first sub-region of each preset region of the multiple preset regions of the substrate further includes: forming a first semiconductor layer, a light emitting layer and a second semiconductor layer successively in a positioning region of the substrate; and etching the part of the light emitting layer and the part of the second semiconductor layer in the first sub-region to expose the part of the first semiconductor layer further includes: etching a part of the light emitting layer and a part of the second semiconductor layer in the positioning region to expose a part of the first semiconductor layer, where the exposed first semiconductor layer in the positioning region serves as a positioning mark that is used when forming the ink layer and arranging the fingerprint chip.

In some embodiments of the present disclosure, forming the fingerprint recognition units respectively in the multiple independent preset regions of the substrate further includes: arranging a light guiding pattern in a third sub-region of each preset region of the multiple preset regions of the substrate, where the third sub-region of the each preset region is a region around the first sub-region and the second sub-region of the each preset region.

In some embodiments of the present disclosure, the at least one light emitting component includes at least two light emitting components, and the at least two light emitting components are uniformly arranged around the fingerprint recognition component.

In some embodiments of the present disclosure, the at least one light emitting component includes two light emitting components, and the two light emitting components are respectively arranged at two sides of the fingerprint recognition component.

In some embodiments of the present disclosure, the second electrode is a high-reflectivity electrode.

In some embodiments of the present disclosure, the method further includes: polishing the substrate to have a thickness ranging from 0.08 mm to 0.3 mm, inclusively.

In another aspect, a device for fingerprint recognition is provided in the present disclosure, including: a fingerprint recognition unit, including a fingerprint recognition component and at least one light emitting component; and a control circuit coupled to the fingerprint recognition unit. The fingerprint recognition component is arranged to achieve a fingerprint recognition function, the at least one light emitting component is arranged to indicate a fingerprint recognition result, and the control circuit is arranged to control an operating state of the at least one light emitting component based on the fingerprint recognition result of the fingerprint recognition component.

In some embodiments of the present disclosure, the operating state of the at least one light emitting component includes at least one of a brightness degree of emitted light or a color of the emitted light.

In some embodiments of the present disclosure, the fingerprint recognition component includes a fingerprint chip.

In some embodiments of the present disclosure, the at least one light emitting component includes: a first semiconductor layer, a light emitting layer and a second semiconductor layer. A first electrode is arranged on the first semiconductor layer, a second electrode is arranged on the second semiconductor layer, and the first electrode and the second electrode are respectively electrically connected to the control circuit through a first lead and a second lead. The second electrode is a high-reflectivity electrode.

In still another aspect, an electronic apparatus is provided in the present disclosure, including the above described device for fingerprint recognition.

In some embodiments of the present disclosure, the electronic apparatus further includes a telecommunication module, where the control circuit is configured to control the operating state of the at least one light emitting component based on a running state of the telecommunication module.

BRIEF DESCRIPTION OF THE DRAWINGS

Drawings are used to provide further understanding of the present disclosure and these described drawings are a part of the present disclosure. Exemplary embodiments of the present disclosure and descriptions thereof are used to explain rather than to limit the present disclosure.

DETAILED DESCRIPTION

In related technologies, when operating a terminal apparatus through fingerprint recognition, operating results cannot be reflected directly, resulting in a poor user experience. In view of the above, the present disclosure provides in some embodiments a device for fingerprint recognition, a manufacturing method therefor, and an electronic apparatus.

To further explain the device for fingerprint recognition, the manufacturing method therefor and the electronic apparatus according to the embodiments of the present disclosure, detailed descriptions are given hereinafter in conjunction with drawings of the present disclosure.

Figure 1:
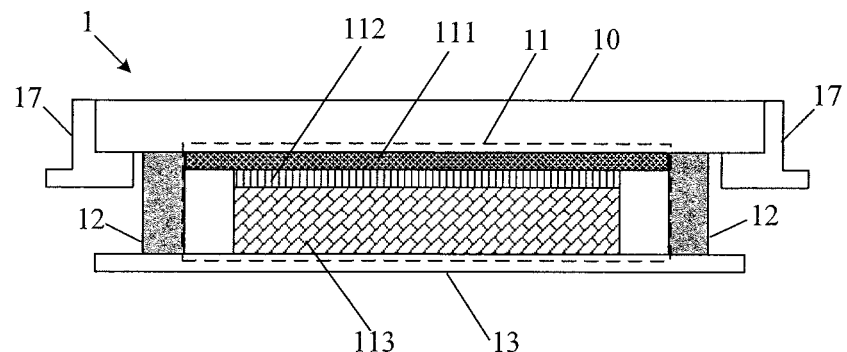
FIG. 1 is a schematic structural diagram of a device for fingerprint recognition according to an embodiment of the present disclosure.
Figure 9:
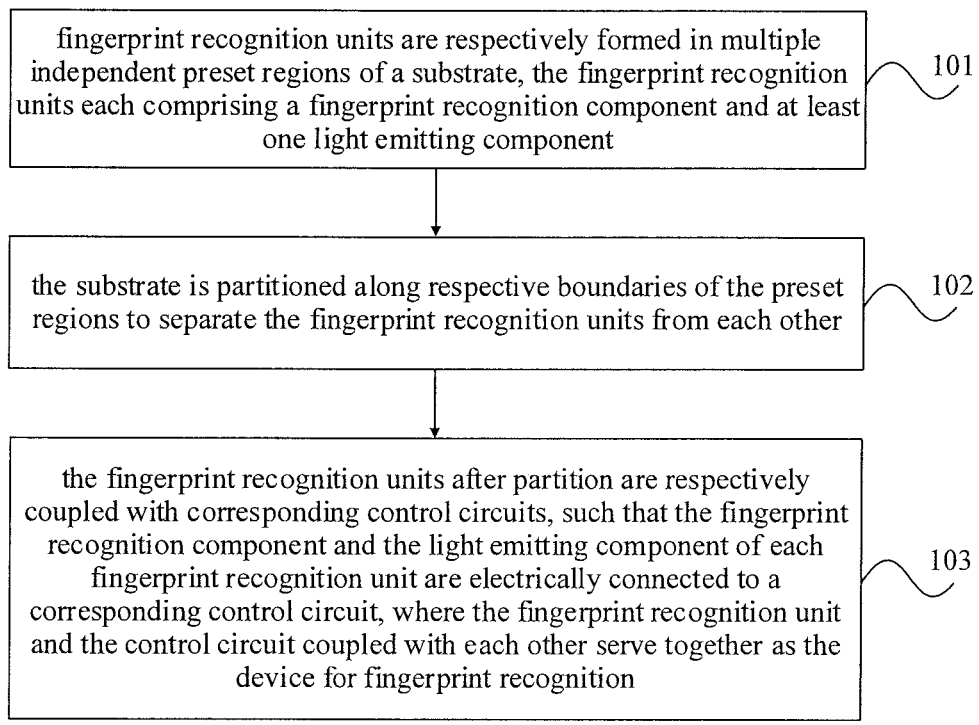
FIG. 9 is a flow chart of a method for manufacturing a device for fingerprint recognition according to an embodiment of the present disclosure.

Reference is to be made to FIG. 1 and FIG. 9. A method for manufacturing a device for fingerprint recognition is provided according to an embodiment of the present disclosure. The method includes steps 101 to 103.

In step 101, fingerprint recognition units are respectively formed in multiple independent preset regions of a substrate 10. Each fingerprint recognition unit includes a fingerprint recognition component 11 and at least one light emitting component 12.

Specifically, the multiple independent preset regions may be defined on the substrate 10, the fingerprint recognition unit is formed in each preset region, and the fingerprint recognition unit includes the fingerprint recognition component 11 configured to achieve a fingerprint recognition function and the at least one light emitting component 12 capable of reflecting a fingerprint recognition result. It should be noted that the substrate 10 may be of various types, for example, a sapphire substrate may be used as the substrate 10.

In step 102, the substrate 10 is partitioned along respective boundaries of the preset regions to separate the fingerprint recognition units from each other.

Specifically, after the multiple independent fingerprint recognition units are formed on the substrate 10, there is a distance between adjacent fingerprint recognition units, so the substrate 10 may be partitioned along the boundaries of the preset regions to separate the fingerprint recognition units from each other. It should be noted that there are various ways of partitioning, for example, the substrate 10 may be partitioned by laser.

In step 103, the fingerprint recognition units after partition are respectively coupled with corresponding control circuits 13, such that the fingerprint recognition component 11 and the light emitting component 12 of each fingerprint recognition unit are electrically connected to a corresponding control circuit 13 that is coupled with the each fingerprint recognition unit. The fingerprint recognition unit and the control circuit 13 coupled with each other serve together as one device for fingerprint recognition 1.

In some embodiments of the present disclosure, the control circuit 13 may be specifically a circuit board, and coupling the fingerprint recognition units after partition respectively with the corresponding control circuits may specifically include: binding the fingerprint recognition units after partition respectively with the corresponding circuit boards.

Specifically, the fingerprint recognition unit after separation may be welded on a corresponding control circuit 13 such that the fingerprint recognition component 11 and the light emitting component 12 of the fingerprint recognition unit are both electrically connected to the control circuit 13. When a user uses the device for fingerprint recognition 1 to perform fingerprint recognition, the control circuit 13 may control an operating state of the light emitting component 12 based a recognition result of the fingerprint recognition component 11. For example, when the fingerprint recognition component 11 recognizes that a fingerprint of the user is wrong, the control circuit 13 controls the light emitting component 12 to be in a flickering state; and when the fingerprint recognition component 11 recognizes that a fingerprint of the user is right, the control circuit 13 controls the light emitting component 12 to be in a normally-on state.

According to specific steps of the above described method and the operating process of device for fingerprint recognition manufactured through the method, in the method for manufacturing the device for fingerprint recognition provided in the embodiments of the present disclosure, the multiple independent fingerprint recognition units are formed on the substrate 10, where each fingerprint recognition unit includes the fingerprint recognition component and the at least one light emitting component 12; the substrate is partitioned to separate the fingerprint recognition units from each other; and each fingerprint recognition unit after separation is coupled onto the control circuit 13 to form the entire device for fingerprint recognition 1.

When using the device for fingerprint recognition 1 manufactured through the method according to the embodiments of the present disclosure to perform fingerprint recognition, a controlling system (e.g., a controlling sub-circuit) in the control circuit 13 may control the operating state of the light emitting component 12 (e.g., a light emitting state of the light emitting component 12, including at least one of a brightness degree or a color of emitted light) based on a running state of the fingerprint recognition component 11. In this way, in a case of applying the device for fingerprint recognition 1 manufactured by the method according to the embodiments of the present disclosure to a terminal apparatus, the device for fingerprint recognition 1 can directly reflect a controlling result when the user controls the terminal apparatus via the device for fingerprint recognition 1, improving user experience. In addition, in a case of applying the device for fingerprint recognition 1 manufactured by the method according to the embodiments of the present disclosure to the terminal apparatus, the controlling system in the control circuit 13 may control the operating state of the light emitting component 12 based on a running state of another module of the terminal apparatus, thereby directly reflecting the running state of the another module. For example, the controlling system in the control circuit 13 may control the light emitting state of the light emitting component 12 based on a running state of a telecommunication module of the terminal apparatus. Specifically, a prompt may be made by controlling the light emitting state of the light emitting component 12 when a cellphone receives a message.

In the related technologies, individual light emitting components 12 are obtained through a series of processes such as scribing, breaking and encapsulating, the light emitting component 12 is attached to a substrate 10, and the light emitting component 12 and a fingerprint recognition component 11 together form a device for fingerprint recognition 1. In the method for manufacturing the device for fingerprint recognition according to the embodiments of the present disclosure, the light emitting component 12 is formed directly on the substrate 10. Compared with the approach in the related technologies, the method for manufacturing the device for fingerprint recognition according to the embodiments of the present disclosure does not require a series of processes such as scribing, breaking, encapsulating and surface mounting, which simplifies the manufacturing procedure and reducing the manufacturing cost.

In the related technologies, a large cover plate is partitioned into individual cover plates according to required sizes, a fingerprint chip group is partitioned into individual fingerprint chips, and each cover plate is attached to one fingerprint chip to form a fingerprint recognition module. In the method for manufacturing the device for fingerprint recognition according to the embodiments of the present disclosure, an array of the fingerprint recognition units are formed on the substrate 10 and then the substrate is partitioned to obtain independent fingerprint recognition units. Compared with the approach in the related technologies, with the method for manufacturing the device for fingerprint recognition according to the embodiments of the present disclosure, the production efficiency is highly improved, and the production period is shortened. Moreover, the manufactured devices for fingerprint recognitions 1 have relatively good uniformity, and a position offset which is apt to occur in attaching is prevented.

Furthermore, the light emitting component 12 in the fingerprint recognition unit according to the embodiments may have various types, such as a light-emitting diode (LED) and so on. A process of forming light emitting components 12 in the multiple independent preset regions of the substrate 10 in step 101 is detailed hereinafter by taking a case in which the light emitting components 12 are LEDs as an example.

In some embodiments of the present disclosure, the process of forming the light emitting components 12 in the multiple independent preset regions of the substrate 10 may include steps 1011 to 1013.

Figure 3:
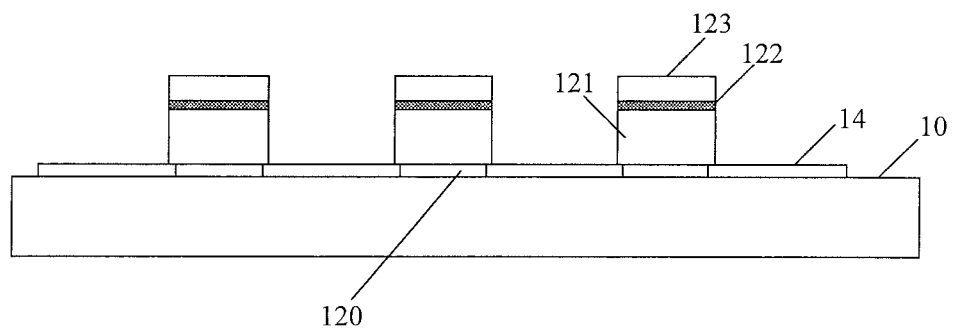
FIG. 3 is a schematic diagram of forming semiconductor layers and a light emitting layer in a light emitting component according to an embodiment of the present disclosure.

In step 1011, a first semiconductor layer 121, a light emitting layer 122 and a second semiconductor layer 123 are successively formed in a first sub-region of each preset region of the substrate 10, as shown in FIG. 3.

Specifically, a first semiconductor film may be formed with a first semiconductor material, a light emitting film may be formed on the first semiconductor film with a light emitting material, and a second semiconductor film may be formed on the light emitting film with a second semiconductor material; then, the first semiconductor film, the light emitting film and the second semiconductor film are patterned through a patterning process to form the first semiconductor layer 121, the light emitting layer 122 and the second semiconductor layer 123 in the first sub-region of each preset region.

It should be noted, the first semiconductor layer 121 may be an n-type semiconductor layer, the second semiconductor layer 123 may be a p-type semiconductor layer, and the light emitting layer 122 may be a monochromatic light emitting layer 122 such as a red, green or blue light emitting layer 122, or may be a composite light emitting layer 122 such as a while light emitting layer 122 which is a composite of a blue light emitting layer 122 and a yellow light emitting layer 122.

Figure 4:
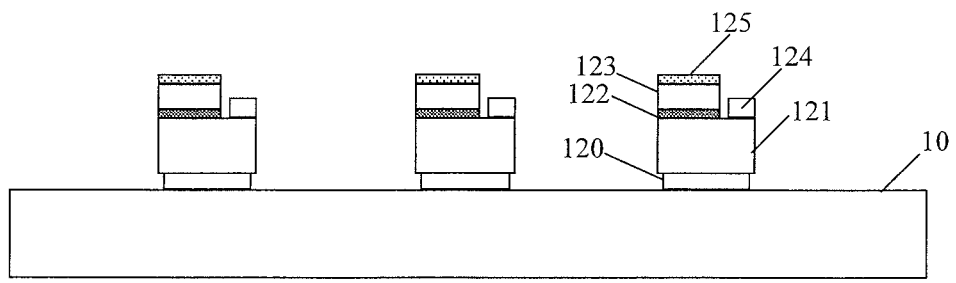
FIG. 4 is a schematic diagram of forming electrodes in a light emitting component according to an embodiment of the present disclosure.
Figure 5:
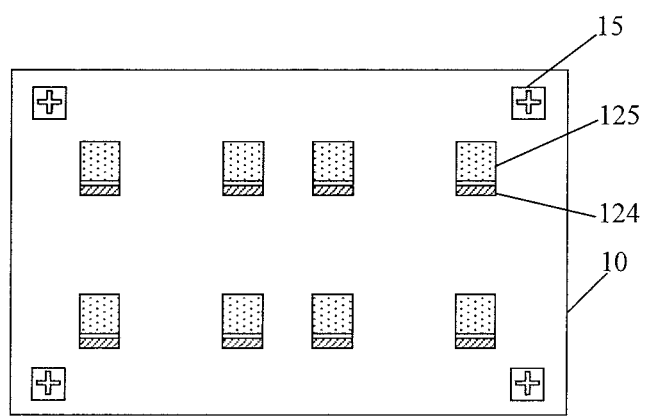
FIG. 5 is a top view corresponding to FIG. 4.

In step 1012, a part of the light emitting layer 122 and a part of the second semiconductor layer 123 in each first sub-region are etched to expose a part of the first semiconductor layer 121, as shown in FIG. 4 and FIG. 5.

Specifically, the light emitting layer 122 and the second semiconductor layer 123 in each first sub-region are partially etched through an etching process to expose a part of the first semiconductor layer 121 to generate a step. It should be noted, a dry etching or a wet etching may be selected as the etching process according to actual needs. For example, the second semiconductor layer 123 and the light emitting layer 122 may be etched with the dry etching to ensure a good etching accuracy.

In step 1013, a first electrode 124 is formed on the exposed first semiconductor layer 121 in each first sub-region, and a second electrode 125 is formed on the second semiconductor layer 123 remained after etching in the each first sub-region.

Specifically, the first electrode 124 (which may be an n-type electrode) may be formed on the exposed first semiconductor layer 121 in each first sub-region, and the second electrode 125 (which may be a p-type electrode) may be formed on the second semiconductor layer 123 remained after etching in the each first sub-region. In addition, the second electrode 125 may be implemented as a high-reflectivity electrode; in this way, when light emitted by the light emitting layer 122 strikes on the second electrode 125, the second electrode 125 may reflect the light to a side where the substrate 10 is located, thereby improving a light emitting efficiency of the light emitting component 12 and better ensuring the light emitting effect.

After forming the first electrode 124 and the second electrode 125, the substrate 10 may be further polished. For example, the substrate may be polished to have a thickness ranging from 0.08 mm to 0.3 mm, inclusively. In this way, it is ensured that the light emitted by the light emitting component 12 can better come out from the side of the substrate 10, and a good recognition accuracy is ensured when a user uses the fingerprint recognition component 11 to perform fingerprint recognition. Furthermore, the manufactured device for fingerprint recognition 1 has a relatively small thickness; consequently, when applying the device for fingerprint recognition 1 into a terminal apparatus, the terminal apparatus may tend to be thinner.

The process of forming the light emitting components 12 in the multiple independent preset regions of the substrate 10 may further include step 1014: binding a lead substrate, having a first lead 128 and a second lead 129, to each first sub-region, where the first lead 128 and the second lead 129 of each lead substrate are bonded to the first electrode 124 and the second electrode 125 of the first sub-region correspondingly bound to the each lead substrate. The first lead 128 and the second lead 129 are arranged to be electrically connected to the control circuit 13, as shown in FIG. 6.

Specifically, after forming the first electrode 124 and the second electrode 125, the lead substrate may be further bound to the first sub-region. The lead substrate may be provided with two independent leads which may be bonded to the first electrode 124 and the second electrode 125 respectively. Hence, the first electrode 124 and the second electrode 125 are leaded to an exterior of the light emitting component 12 and an entire light emitting component 12 is formed. In subsequent utilization of the light emitting component 12, the light emitting component 12 may be welded to the control circuit 13 through the two leads, and the control circuit 13 may supply power to the light emitting component 12 through the two leads. It should be noted that, the first lead 128 and the second lead 129 may be, for example, metallic leads, and the lead substrate may be, for example, a ceramic substrate.

In some embodiments of the present disclosure, the binding a lead substrate, having a first lead 128 and a second lead 129, to each first sub-region in step 1014 may specifically include: arranging a first metallic ball 126 (e.g., a golden ball) and a second metallic ball 127 (e.g., a golden ball) respectively on the first electrode 124 and the second electrode 125 of each first sub-region; and providing lead substrates in a one-to-one correspondence to the first sub-regions, and welding the first lead 128 and the second lead 129 of each lead substrate respectively onto the first metallic ball 126 and the second metallic ball 127 of the first sub-region corresponding to the each lead substrate.

Figure 6:
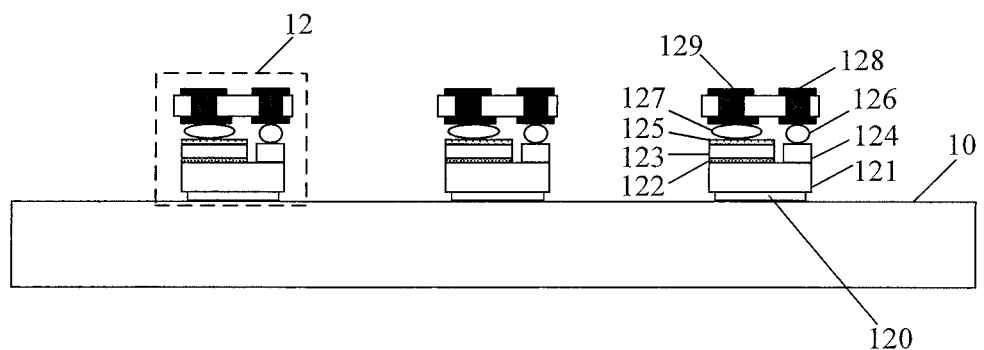
FIG. 6 is a schematic diagram of forming an entire light emitting component according to an embodiment of the present disclosure.

As shown in FIG. 6, a distance of a top of the first metallic ball 126 from a surface of the substrate 10 is identical to or substantially identical to a distance of a top of the second metallic ball 127 from the surface of the substrate 10.

In detail, metallic balls may be respectively mounted on the first electrode 124 and the second electrode 125 with a ball mounter. In order that a positive electrode and a negative electrode of the manufactured light emitting component 12 may have almost the same height, the height of the first metallic ball 126 from the substrate 10 and the height of the second metallic ball 127 from the substrate 10 may be arranged to be identical or substantially identical. Then, the lead substrate is bound to each first sub-region, that is, the first lead 128 and the second lead 129 of each lead substrate are respectively welded onto the first metallic ball 126 and the second metallic ball 127 of the first sub-region corresponding to the each lead substrate, such that the first lead 128 and the second lead 129 of the lead substrate can be bonded to the first electrode 124 and the second electrode 125 through the first metallic ball 126 and the second metallic ball 127 corresponding to the first lead 128 and the second lead 129.

In the related technologies, individual light emitting components 12 are obtained through a series of processes such as scribing, breaking and encapsulating, the light emitting component 12 is attached to a substrate 10, and the light emitting component 12 and a fingerprint recognition component 11 together form a device for fingerprint recognition 1. It can be known from the above described procedure for manufacturing the light emitting component 12, in the method for manufacturing the device for fingerprint recognition according to the embodiments of the present disclosure, the light emitting component 12 is directly formed on the substrate 10 with an epitaxial growth approach. Compared with the approach in the related technologies, in the method for manufacturing the device for fingerprint recognition according to the embodiments of the present disclosure, the light emitting component 12 is directly integrated into the fingerprint recognition unit, and a series of processes such as scribing, breaking, encapsulating and surface mounting are omitted, which simplifies the manufacturing procedure and reducing the manufacturing cost.

Figure 2:
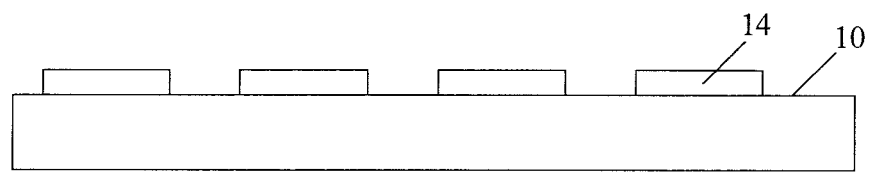
FIG. 2 is a schematic diagram of a sacrificial pattern formed on a substrate according to an embodiment of the present disclosure.

In some embodiments of the present disclosure, the forming the first semiconductor layer 121, the light emitting layer 122 and the second semiconductor layer 123 successively in the first sub-region of each preset region of the substrate 10 in step 1011 may include:

forming a sacrificial pattern 14, which has an opening, in the first sub-region of the each preset region on the substrate 10, as shown in FIG. 2;

taking a portion of the substrate 10 corresponding to a portion of the first sub-region where the sacrificial pattern 14 is not formed (i.e., a portion of the first sub-region corresponding to the opening of the sacrificial pattern 14) as a growth base, and growing a buffer layer 120 on the growth base in the first sub-region, as shown in FIG. 3;

successively forming the first semiconductor layer 121, the light emitting layer 122 and the second semiconductor layer 123 on the buffer layer 120 of each first sub-region; and removing the sacrificial pattern 14 from the first sub-region, as shown in FIG. 4.

Specifically, a mask material may be deposited onto the substrate 10 to form a mask material film, and then the mask material film is patterned to form the sacrificial patterns 14 having the openings, where the openings defined by the sacrificial patterns 14 are in a one-to-one correspondence to the first sub-regions of the preset regions. It should be noted that various kinds of mask materials may be adopted, such as $SiO_2$, $Si_3N_4$, Ti and so on.

After forming the sacrificial patterns having the openings, portions of the substrate 10 corresponding to the portions of the first sub-regions where the sacrificial patterns 14 are not formed (i.e., regions where the openings are formed) are taken as the growth bases, the buffer layer 120 is formed on the growth base in each first sub-region, the first semiconductor layer 121, the light emitting layer 122 and the second semiconductor layer 123 are successively formed on the buffer layer 120, and after the second semiconductor layer 123 is formed, the sacrificial pattern 14 may be removed through a wet corrosion process.

Figure 7:
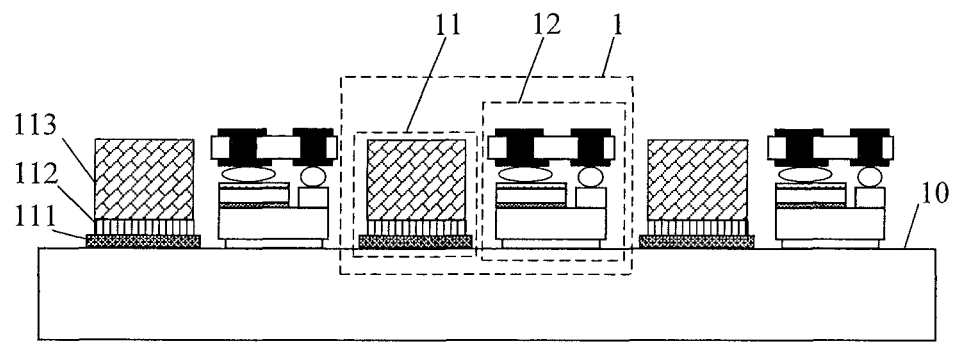
FIG. 7 is a schematic diagram of forming a fingerprint recognition component according to an embodiment of the present disclosure.
Figure 8:
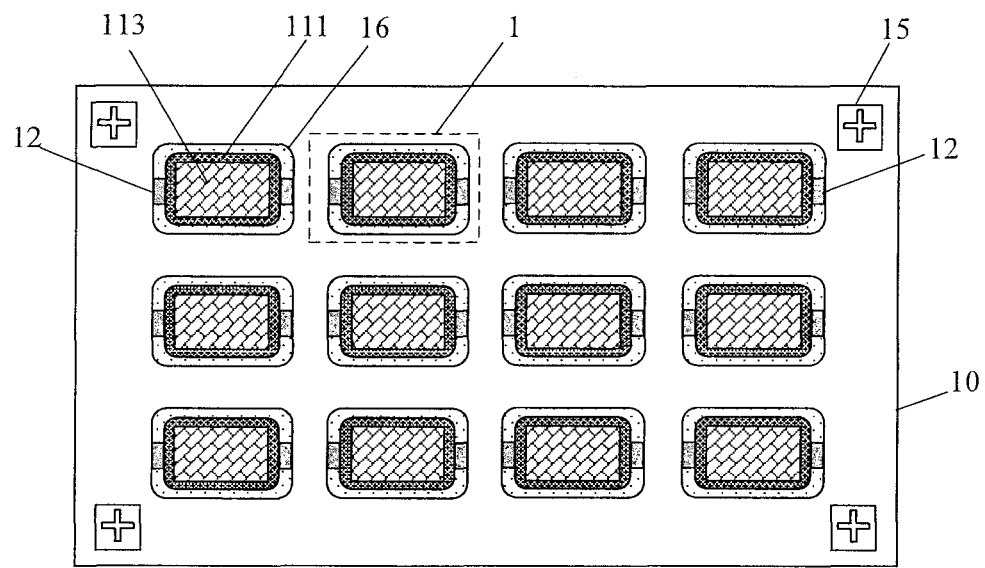
FIG. 8 is a top view corresponding to FIG. 7.

In some embodiments of the present disclosure, the process of forming fingerprint recognition components 11 in the multiple independent preset regions of the substrate 10 in step 101 may include: forming an ink layer 111 in a second sub-region of each preset region of the substrate 10, as shown in FIG. 7 and FIG. 8; and providing a fingerprint chip 113 on the ink layer 111 in each second sub-region, where the fingerprint chip 113 is arranged to be electrically connected to the control circuit 13.

Specifically, ink may be printed uniformly in the second sub-regions of the preset regions, to form the ink layers 111 for adjusting colors of the second sub-regions, and then the fingerprint chip 113 is attached to the ink layer 111 in each second sub-region by using an adhesive 112. The fingerprint chip 113 is configured to achieve a fingerprint recognition function, and may be welded onto the control circuit 13 to achieve an electrical connection between the fingerprint chip 113 and the control circuit 13.

After manufacturing the device for fingerprint recognition 1, the device for fingerprint recognition 1 may be mounted on the terminal apparatus. For example, the device for fingerprint recognition 1 may be fixed on the terminal apparatus via a metallic ring 17 (as show in FIG. 1). In this way, a running state of the terminal apparatus may be controlled via the fingerprint recognition component 11 in the device for fingerprint recognition 1. In detail, when the fingerprint recognition unit is in operation, the fingerprint chip 113 in the fingerprint recognition component 11 performs fingerprint recognition, and the controlling system in the control circuit 13 controls the light emitting state of the light emitting component 12 based on the running state of the fingerprint chip, thereby directly reflecting a fingerprint recognition result.

Furthermore, since an array of multiple fingerprint recognition components 11 are manufactured on the substrate 10, and each fingerprint recognition component 11 corresponds to at least one light emitting component 12, the fingerprint recognition components 11 need to be manufactured at specified positions. To better meet the above requirement, the forming the first semiconductor layer 121, the light emitting layer 122 and the second semiconductor layer 123 successively in the first sub-region of each preset region of the substrate 10 in step 1011 may further include: forming a first semiconductor layer, a light emitting layer and a second semiconductor layer successively in a positioning region of the substrate 10. The etching the part of the light emitting layer 122 and the part of the second semiconductor layer 123 in each first sub-region to expose the part of the first semiconductor layer 121 in step 1012 may further include: etching a part of the light emitting layer and a part of the second semiconductor layer in the positioning region to expose a part of the first semiconductor layer. The exposed first semiconductor layer in the positioning region serves as a positioning mark 15 which may be used when forming the ink layers 111 and arranging the fingerprint chips 113, as shown in FIG. 5.

Specifically, the first semiconductor layer, the light emitting layer and the second semiconductor layer may be successively formed in the positioning region of the substrate 10 simultaneously when forming the first semiconductor layer 121, the light emitting layer 122 and the second semiconductor layer 123 in the first sub-region, and the second semiconductor layer and the light emitting layer in the positioning region are etched simultaneously when partially etching the second semiconductor layer 123 and the light emitting layer 122 in the first sub-region. In this way, respective films included in the light emitting component 12 and the positioning mark 15 in the positioning region are formed through one semiconductor process, avoiding adding an additional process for manufacturing the positioning mark 15. In addition, since the positioning mark 15 is manufactured through the semiconductor process, advantages such as high accuracy and small deviation are achieved.

By providing the positioning mark 15 on the substrate 10, a position where the ink layer 111 is deposited and a position where the fingerprint chip 113 is attached may both be determined by the positioning mark 15 during the manufacture of the fingerprint recognition component 11, such that the fingerprint recognition components 11 may not be subjected to position offset easily and may have relatively good uniformity.

It should be noted, when forming the positioning mark 15, a shape of the positioning mark 15 may be set according to actual needs, and a specific procedure for making the positioning mark is not limited to what disclosed herein.

In some embodiments of the present disclosure, the forming the fingerprint recognition units respectively in the multiple independent preset regions of the substrate 10 in step 101 may further include: arranging a light guiding pattern 16 in a third sub-region of each preset region of the substrate 10, as shown in FIG. 8. The third sub-region of each preset region may be a region around the first sub-region and the second sub-region of the preset region.

Specifically, in the manufacture of the fingerprint recognition unit, one or more light emitting components 12 may be arranged according to actual needs. In a case that the fingerprint recognition unit includes multiple light emitting components 12, the multiple light emitting components 12 may be uniformly distributed around the fingerprint recognition component 11, to achieve better light emitting effect. In addition, to further improve the light emitting effect of the light emitting component 12, the light guiding pattern 16 may be arranged in the third sub-region around the first sub-region and the second sub-region. The light guiding pattern 16 may be, for example, a light guiding ring surrounding the first sub-region and the second sub-region. In this way, light emitted by the light emitting component 12 may be dispersed along the light guiding ring, and the emitted light of the device for fingerprint recognition 1 is more uniform.

A device for fingerprint recognition 1 is further provided according to an embodiment of the present disclosure. The device for fingerprint recognition 1, as shown in FIG. 1, is manufactured by the method for manufacturing the device for fingerprint recognition according to the foregoing embodiments.

Specifically, the device for fingerprint recognition 1 includes a fingerprint recognition unit and a control circuit 13 that are coupled to each other. The fingerprint recognition unit includes a fingerprint recognition component 11 and at least one light emitting component 12. In a case of applying the device for fingerprint recognition 1 in a terminal apparatus, a user may control the terminal apparatus via the device for fingerprint recognition 1 and the device for fingerprint recognition 1 may directly reflect a controlling result, which greatly improves user experience. In addition, since the device for fingerprint recognition 1 achieves a light feedback via the light emitting component 12 therein, aesthetic degree is also enhanced while the user experience is improved.

Furthermore, since the device for fingerprint recognition 1 according to the embodiments of the present disclosure is manufactured by the method according to the foregoing embodiments, the manufacturing procedure is simple, the cost is low, the devices for fingerprint recognition 1 are ensured with good uniformity, and position offset of the devices for fingerprint recognition 1 is prevented.

In some embodiments of the present disclosure, the device for fingerprint recognition 1 may include two light emitting components 12, and the two light emitting components 12 are respectively arranged at two sides of the fingerprint recognition component 11.

Specifically, one or more light emitting components 12 may be arranged in the device for fingerprint recognition 1 according to actual needs. In a case that the fingerprint recognition unit includes multiple light emitting components 12, the multiple light emitting components 12 may be uniformly distributed around the fingerprint recognition component 11, to achieve better light emitting effect. In addition, to further improve the light emitting effect of the light emitting component 12, a light guiding pattern 16 may be arranged in the device for fingerprint recognition 1. As shown in FIG. 8, the light guiding pattern 16 may be arranged in a third sub-region around a first sub-region and a second sub-region. The light guiding pattern 16 may be, for example, a light guiding ring surrounding the fingerprint recognition component 11. In this way, light emitted by the light emitting component 12 may be dispersed along the light guiding ring, and the emitted light of the device for fingerprint recognition 1 is more uniform.

Furthermore, the light emitting component 12 in the embodiments may have various types, for example, may be an LED. In a case that an LED serves as the light emitting component 12, a specific structure of the light emitting component 12 may include: a first semiconductor layer 121, a part of a light emitting layer 122 and a part of a second semiconductor layer 123 that are successively formed in the first sub-region of each preset region. The part of the light emitting layer 122 and the part of the second semiconductor layer 123 cover a partial region of the first semiconductor layer 121. A first electrode 124 is formed in a region of the first semiconductor layer 121 which is not covered by the part of the light emitting layer 122 and the part of the second semiconductor layer 123. A second electrode 125 is formed on the part of the second semiconductor layer 123. A first metallic ball 126 is arranged on the first electrode 124, a second metallic ball 127 is arranged on the second electrode 125, and a height of the first metallic ball 126 from the substrate 10 is identical or substantially identical to a height of the second metallic ball 127 from the substrate 10. A first lead 128 is arranged on the first metallic ball 126 and a second lead 129 is arranged on the second metallic ball 127. The two leads are arranged on a lead substrate. The first lead 128 and the second lead 129 are connected to the control circuit 13 in the device for fingerprint recognition 1.

In some embodiments of the present disclosure, in the light emitting component 12, a buffer layer 120 may be formed between the first semiconductor layer 121 and the substrate 10.

In some embodiments of the present disclosure, the fingerprint recognition component 11 may include an ink layer 111 arranged in a second sub-region of the preset region and a fingerprint chip 113 arranged on the ink layer 111. The fingerprint chip 113 is connected to the control circuit 13.

An electronic apparatus is further provided according to an embodiment of the present disclosure, including the device for fingerprint recognition according to the foregoing embodiments.

The electronic apparatus according to the embodiments of the present disclosure includes the above described device for fingerprint recognition. When a user controls the electronic apparatus via the device for fingerprint recognition, the fingerprint recognition device may directly reflect a controlling result, which greatly improves user experience. In addition, since the device for fingerprint recognition has advantages of simple manufacturing procedure, low cost, good uniformity and free of position offset, the electronic apparatus according to the embodiments of the present disclosure also has these advantages.

Unless otherwise defined, technical terms or scientific terms used in the present disclosure shall have common meanings understood by the ordinary skilled in the art. Terms such as "first" and "second" in the present disclosure do not indicate any order, quantity or importance, and they are merely used to distinguish different components. Terms such as "include" or "contain" indicate that an element or object before such terms covers an element, an object or the equivalent enumerated after such terms, and do not exclude other elements and objects. Terms such as "coupled" and "connected" are not used to limit physical or mechanical connection, they may be direct or indirect electrical connection. Terms such as "above", "below", "left" and "right" are merely to describe relative position relationships, and if an absolute position of a described object changes, relative positions with respect to the described object may change correspondingly.

It can be understood, if an element such as a layer, a film, a region or a substrate is described to be on or below another element, the element may be directly on or below the other element, or there may be an intermediate element between the element and the other element.

Specific features, structures, materials and characteristics in descriptions of the above implementations may be combined properly in one or more embodiments or examples.

Specific implementations of the present disclosure are disclosed hereinabove, and the present disclosure is not limited thereto. Any modifications and changes easily made by the skilled in the art without departing from the technical scope disclosed in the present disclosure fall within the protection scope of the present disclosure. The protection scope of the present disclosure should conform with the scope defined by the appended claims.

What is claimed is:

1. A method for manufacturing a device for fingerprint recognition, comprising:
   forming fingerprint recognition units respectively in a plurality of independent preset regions of a substrate, wherein the fingerprint recognition units each comprise a fingerprint recognition component and at least one light emitting component;
   partitioning the substrate along respective boundaries of the preset regions to separate the fingerprint recognition units from each other; and
   coupling the fingerprint recognition units after partition respectively with corresponding control circuits, to make the fingerprint recognition component and the light emitting component of each fingerprint recognition unit of the fingerprint recognition units be electrically connected to a corresponding control circuit that is coupled with the each fingerprint recognition unit, wherein the fingerprint recognition unit and the control circuit coupled with each other serve together as the device for fingerprint recognition.

2. The method according to claim 1, wherein forming the light emitting components in the plurality of independent preset regions of the substrate comprises:
   forming a first semiconductor layer, a light emitting layer and a second semiconductor layer successively in a first sub-region of each preset region of the plurality of preset regions of the substrate;
   etching a part of the light emitting layer and a part of the second semiconductor layer in the first sub-region to expose a part of the first semiconductor layer; and
   forming a first electrode on the exposed first semiconductor layer in the first sub-region, and forming a second electrode on the second semiconductor layer remained after etching in the first sub-region.

3. The method according to claim 2, wherein the forming the light emitting components in the plurality of independent preset regions of the substrate further comprises:
   binding a lead substrate, having a first lead and a second lead, to the first sub-region, wherein the first lead and the second lead of the lead substrate are respectively bonded to the first electrode and the second electrode of the first sub-region correspondingly bound with the lead substrate, and wherein the first lead and the second lead are arranged to be electrically connected to the control circuit.

4. The method according to claim 3, wherein binding the lead substrate, having the first lead and the second lead, to the first sub-region comprises:
   arranging a first metallic ball and a second metallic ball respectively on the first electrode and the second electrode of the first sub-region, wherein a distance of a top of the first metallic ball from a surface of the substrate is identical to or substantially identical to a distance of a top of the second metallic ball from the surface of the substrate; and
   providing the lead substrates in a one-to-one correspondence to the first sub-regions, and welding the first lead and the second lead of each lead substrate of the lead substrates onto the first metallic ball and the second metallic ball of the first sub-region corresponding to the each lead substrate.

5. The method according to claim 2, wherein forming the first semiconductor layer, the light emitting layer and the second semiconductor layer successively in the first sub-region of each preset region of the plurality of preset regions of the substrate comprises:
   forming a sacrificial pattern, which has an opening, in the first sub-region of the each preset region on the substrate;
   taking a portion of the substrate corresponding to the opening in the first sub-region as a growth base, and growing a buffer layer on the growth base in the first sub-region;
   forming the first semiconductor layer, the light emitting layer and the second semiconductor layer on the buffer layer of the first sub-region successively; and
   removing the sacrificial pattern from the first sub-region.

6. The method according to claim 2, wherein forming the fingerprint recognition components in the plurality of independent preset regions of the substrate comprises:
   forming an ink layer in a second sub-region of each preset region of the plurality of preset regions of the substrate; and
   providing a fingerprint chip on the ink layer in the second sub-region, wherein the fingerprint chip is arranged to be electrically connected to the control circuit.

7. The method according to claim 6, wherein forming the first semiconductor layer, the light emitting layer and the second semiconductor layer successively in the first sub-region of each preset region of the plurality of preset regions of the substrate further comprises: forming a first semiconductor layer, a light emitting layer and a second semiconductor layer successively in a positioning region of the substrate; and
   etching the part of the light emitting layer and the part of the second semiconductor layer in the first sub-region to expose the part of the first semiconductor layer further comprises: etching a part of the light emitting layer and a part of the second semiconductor layer in the positioning region to expose a part of the first semiconductor layer, wherein the exposed first semiconductor layer in the positioning region serves as a positioning mark that is used when forming the ink layer and arranging the fingerprint chip.

8. The method according to claim 6, wherein forming the fingerprint recognition units respectively in the plurality of independent preset regions of the substrate further comprises: arranging a light guiding pattern in a third sub-region of each preset region of the plurality of preset regions of the substrate, wherein the third sub-region of the each preset region is a region around the first sub-region and the second sub-region of the each preset region.

9. The method according to claim 1, wherein the at least one light emitting component comprises at least two light emitting components, and the at least two light emitting components are uniformly arranged around the fingerprint recognition component.

10. The method according to claim 1, wherein the at least one light emitting component comprises two light emitting components, and the two light emitting components are respectively arranged at two sides of the fingerprint recognition component.

11. The method according to claim 2, wherein the second electrode is a high-reflectivity electrode.

12. The method according to claim 2, further comprising: polishing the substrate to have a thickness ranging from 0.08 mm to 0.3 mm, inclusively.

* * * * *

UNITED STATES PATENT AND TRADEMARK OFFICE
CERTIFICATE OF CORRECTION

| | | |
|---|---|---|
| PATENT NO. | : 10,789,446 B2 | Page 1 of 1 |
| APPLICATION NO. | : 16/281352 | |
| DATED | : September 29, 2020 | |
| INVENTOR(S) | : Ting Tian et al. | |

It is certified that error appears in the above-identified patent and that said Letters Patent is hereby corrected as shown below:

On the Title Page

Assignees item (73), Line 1, please insert the word --OPTOELECTRONICS-- between the words "BOE" and "TECHNOLOGY".

Signed and Sealed this
First Day of June, 2021

Drew Hirshfeld
*Performing the Functions and Duties of the*
*Under Secretary of Commerce for Intellectual Property and*
*Director of the United States Patent and Trademark Office*